United States Patent [19]
Das

[11] Patent Number: 4,900,650
[45] Date of Patent: Feb. 13, 1990

[54] METHOD OF PRODUCING A POLE PIECE WITH IMPROVED MAGNETIC DOMAIN STRUCTURE

[75] Inventor: Shyam C. Das, Sudbury, Mass.
[73] Assignee: Digital Equipment Corporation, Maynard, Mass.
[21] Appl. No.: 193,417
[22] Filed: May 12, 1988
[51] Int. Cl.⁴ .............................................. G03C 5/00
[52] U.S. Cl. .................................. 430/319; 430/314; 430/315; 29/603; 360/126
[58] Field of Search ............... 430/320, 323, 324, 330, 430/319, 318, 314, 315; 29/603; 360/126

[56] References Cited
U.S. PATENT DOCUMENTS 3,908,194  9/1975  Romankiw .......................... 360/113
4,652,954  3/1987  Church ............................... 360/120

OTHER PUBLICATIONS

Hanazone et al., "Fabrication of . . . Thin Film Heads", IEEE Trans. Magnetics, vol. Mag-15(6) Nov. 1979, pp. 1616-1618.
Jones, "Domain Effects in Thin Film Head", IEEE Trans. Magnetics, vol. Mag-15(6) Nov. 1979, pp. 1619-1621.

Primary Examiner—Jose G. Dees
Attorney, Agent, or Firm—Fish & Richardson

[57] ABSTRACT

The mask through which the pole piece is deposited by through mask plating has a yoke region, a narrower pole tip region and a bulb region adjacent the pole tip region. The bulb region results in substantially uniform current density during the through mask plating which results in substantially uniform composition and thickness of the pole piece material across the pole piece. In particular, the composition difference between the pole tip and the yoke region is reduced from that according to prior art techniques. The combination of the composition uniformity and the different (than the prior art) stress distribution in the pole tip material results in favorable domain structure in the pole tip. The magnetic domains formed conduct flux by coherent rotation of the magnetization direction in the domains without changing the location of wall boundaries thereby reducing Barkhausen noise.

9 Claims, 2 Drawing Sheets

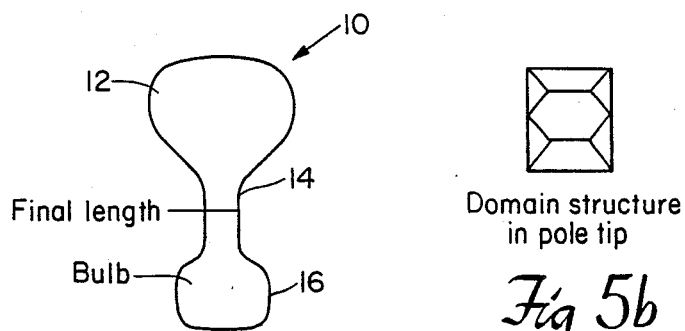
Fig. 5a
Fig. 5b
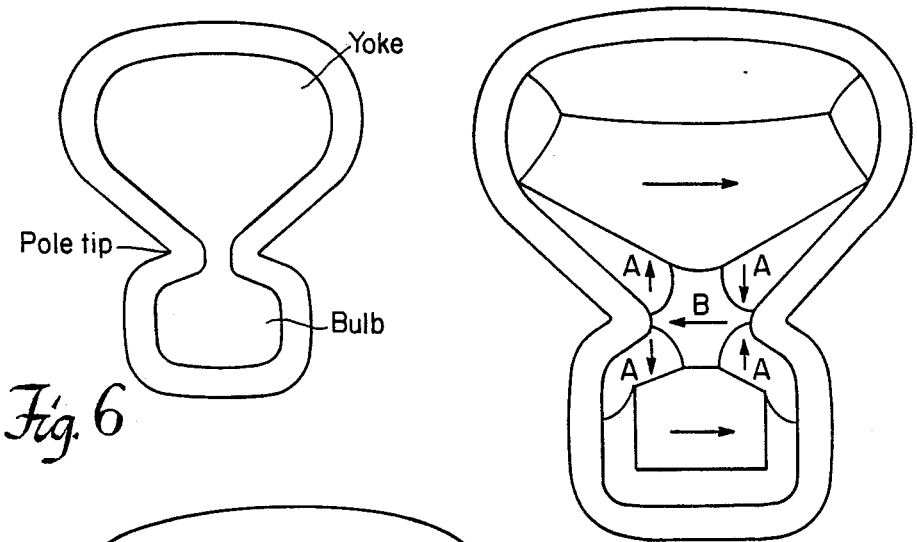
Fig. 6
Fig. 7
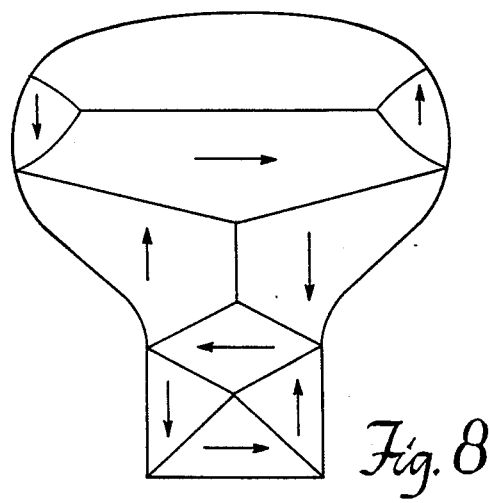
Fig. 8

METHOD OF PRODUCING A POLE PIECE WITH IMPROVED MAGNETIC DOMAIN STRUCTURE

BACKGROUND OF THE INVENTION

This invention relates to thin film magnetic heads.

The structure of magnetic domains within a pole tip is very important in minimizing the amount of noise in the signal and distortion of the signal during readback. "Good" domains are capable of conducting flux by coherent rotation of the magnetization direction in the domains without changing the location of their wall boundaries. FIG. 1 shows domains capable of flux conduction by rotation of the magnetization vector.

As the width of the pole tip W (FIG. 1) is decreased to accommodate narrower track widths, see Fig. 2, the domains that form are "bad" in that they can only conduct flux by wall motion. That is, for the domains to change polarization, the boundary walls move as shown in FIG. 3.

The problem with conduction of flux by wall motion is that the motion of the boundaries can be impeded by imperfections in the material. The boundaries deform and only after the deformation is great enough does the boundary "snap" free of the imperfection. This sudden change in the boundary location is the mechanism which generates Barkhausen noise. Wall motion is a slower process than coherent rotation of magnetization resulting in lower frequency response of the head. This also causes distortion in pulse shape.

Besides depending upon the aspect ratio of the pole tip, what type of domain structure is formed is a function of the composition of the magnetic material of the pole tip and the stress induced in the pole tip during the fabrication process. In fabricating a thin film head magnetic pole, the magnetic material is plated upon a wafer using a mask to form the geometry of the yoke and pole tip. After plating and completion of the wafer processing, the pole tip region is cut and lapped to the desired throat height.

The mask geometry used in the prior art consisted of a large yoke region and a narrower pole tip or neck region. See FIGS. 4a and 4b. The composition of magnetic material in the pole tip in the configuration of FIG. 4 differed significantly from that of the yoke. This difference combined with the stresses created in the material resulted in undesirable magnetic domain structure. It was found, however, that the desired domain structure could be achieved by very precisely controlling the magnetic material composition and the plating field strength followed by annealing the pole. If the parameters varied only slightly, the undesirable pole tip domains would form. The problems in the prior art arose because the current density during the through mask plating was not uniform resulting in non-uniform composition and thickness across the pole geometry.

SUMMARY OF THE INVENTION

The method of producing a thin film head having a pole piece with desired magnetic domain structure includes forming a mask having a yoke region, a narrower pole tip region and a bulb region adjacent the pole tip region. This mask is then employed in through mask plating of the pole piece of the thin film head.

When plating occurs with the extra material in the bulb region of the pole piece, the current density during plating is substantially uniform in the pole tip region resulting in substantially uniform composition and thickness across the pole. In particular, the composition difference between the pole tip and the yoke region is reduced from that achieved in the prior art. Further, since the stress in a plated film is a function of the geometry of the structure, the stress in the pole tip material utilizing the bulb configuration is different from the stress in a corresponding film made by conventional techniques. The similarity in the composition of the yoke and the pole tip, and the change in stress for a negative magnetostrictive NiFe material is effective in aiding the formation of the desired pole domain structure which conducts flux by coherent rotation of the magnetization vector. It has been found experimentally that under the same external plating conditions, the non bulb configuration of the prior art would form undesirable domains while the bulb configuration of the present invention forms desirable domains. It has been determined experimentally that domains in the pole geometry of the prior art are quite sensitive to composition of Ni to Fe ratio as measured on sheet plated films while the geometry of the bulb configuration was not as sensitive.

BRIEF DESCRIPTION OF THE DRAWING

FIG. 4b is a schematic illustration of the domain structures in the pole tip made using the mask geometry of FIG. 4a;

FIG. 5a is a schematic illustration of the mask according to the present invention;

FIG. 5b is a schematic illustration of the domain structures in the pole tip made using the mask of FIG. 5a;

FIG. 6 is a planar view of a mask for practicing the invention;

FIG. 7 is a photograph showing domains in the pole piece made according to the invention; and FIG. 8 is a photograph showing domains in a pole piece made by prior art techniques.

DESCRIPTION OF THE PREFERRED EMBODIMENT

Figure 1:
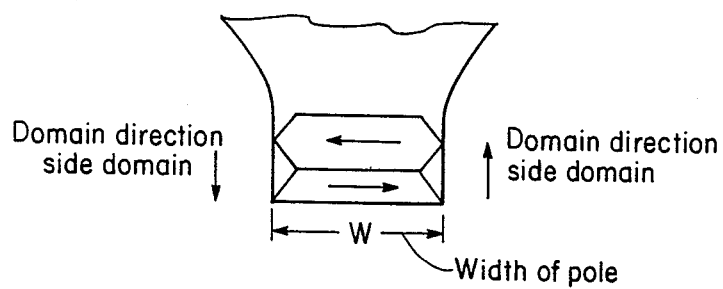
FIG 1 is a schematic illustration of domains capable of flux conduction by rotation of a magnetization vector.

First of all, a brief description will be given of the known processes for making thin film heads. First of all, an insulating base layer of, for example, $Al_2O_3$ is deposited on a substrate. Because this base layer is insulating, a sputtered seed layer of a material such as NiFe is applied to the base layer. Photoresist is then spun over the seed layer and a pole piece pattern is formed by photolithographic techniques. It is the geometry of this pattern and the patterns for the other poles to which the present invention relates and will be discussed in greater detail below. After the photoresist is developed and processed to form a mask, the pole piece, of a material such as NiFe, is deposited by through mask electroplating. This plating operation is performed in the presence of a magnetic field to define the easy axis of magnetization. As discussed above, it is desired that there be uniform current density during the electroplating operation which will result in uniform composition and thickness of the pole piece across the wafer.

After deposition of the pole piece, the seed layer is sputter etched in the non-plated area (small "moat" area around the pole piece, see FIG. 6) to remove it without substantially disturbing the pole piece thickness. A photoresist pattern is applied to protect the pole shape and chemical etching is used to remove the current thief areas which approximates sheet plating. That is, area other than the pole piece is etched which defines the pole piece. Next, a thin gap is deposited such as $Al_2O_3$ and thereafter hard baked photoresist is deposited to define the read and write coil. Thereafter, the coil is formed and layers of insulation applied. A seed layer is deposited for plating a second pole piece.

After all the poles are plated, bonding pads are deposited and the head is encapsulated typically with a thick layer of $Al_2O_3$. Thereafter, the head is lapped back to expose the bonding pad metal. The wafer is typically configured into rows and columns of the above fabricated magnetic transducers and the wafer is cut into rows which are ground to form the individual sliders. The rows are mounted in a lapping fixture which laps the heads to define a final throat height.

As noted above, the present invention involves configuring the mask through which the pole piece is plated to have a bulb region which serves to make substantially uniform the current density during the plating operation so that the pole tip has substantially uniform composition and thickness for desired magnetic domain characteristics.

FIG. 5a shows a pole piece 10 made according to the invention. The pole piece 10 includes a yoke portion 12, a narrow pole tip region 14 and a bulb region 16 adjacent to the pole tip region 14. As discussed above, the geometry of the pole piece 10 is created by photolithographic techniques using a photoresist spun onto a plating seed layer. Thereafter, the photoresist is exposed, and the exposed areas are removed for the positive photoresist process. Fig. 5b is an illustration of the domain structures in the pole tip corresponding to the geometry of FIG. 5a. Fig. 6 is a mask produced for making a thin film head according to the invention. The photoresist in the dark area in FIG. 6 prevents plating so as to define the pole. The desired domain structure is capable of conducting flux by rotation of the magnetization vector and eliminates noise which would result from flux conduction by wall motion.

Figure 2:
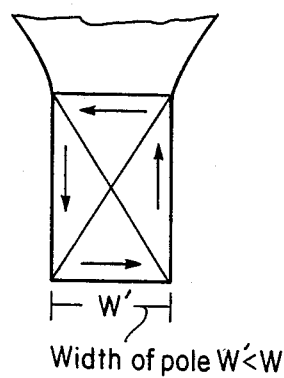
FIGS. 2 and 3 are schematic illustrations of pole tips having domains which conduct flux by wall motion.
Figure 3:
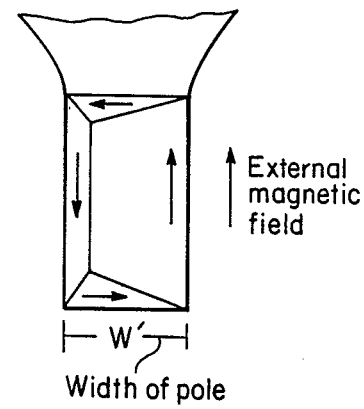
Figure 4A:
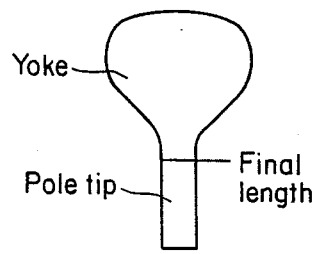
Fig. 4a is an illustration of prior art mask geometry.
Figure 4B:

FIG. 7 is a photograph of a pole piece prepared according to the invention which includes the desired domain structure. The arrows in FIG. 7 interpret the direction of the magnetization in the pole piece. Note that the magnetization direction in the domain B is parallel to the track width. This circumstance is very desirable for the read/write performance of the thin film head. By way of contrast, FIG. 8 shows the domain structure in a pole tip processed in the same way as the pole tip of Fig. 7 except there was no bulb region. Note that the domains resemble the "bad" domains of FIGS. 2 and 3 and 4b. See, "Domain Effects in the Thin Film Head" by R. E. Jones, Jr. in IEEE Transactions on Magnetics, Vol. Mag-15, No. 6, November 1979 for a pole piece geometry of conventional prior art fabrication techniques.

Although through mask plating has been emphasized, it should be noted that deposition of the pole piece material can be achieved by vacuum deposition techniques. The presence of the bulb could change the stress configuration in the pole piece material that could result into desirable domains in the pole tip region. Another way of depositing magnetic material for defining the pole piece could be in sheet form either by plating or vacuum deposition techniques followed by forming the pole piece geometry including the bulb through conventional photolithographic techniques and etching techniques (ion beam or chemical processes). It has been determined experimentally that the domain structure in the pole tip region is better with sheet processing and defining the pole tip by etching than with through mask plating.

The thin film head with improved domains made according to the present invention can be utilized for any head having one or more poles such as, for example, two-pole or three-pole heads utilizing inductive, Hall, or MR flux sensing. The heads can be for vertical or longitudinal applications.

What is claimed is:

1. Method of producing a thin film head made of a magnetic alloy having a pole tip region with desired magnetic domain structures comprising:
   forming a mask having a yoke region, a narrower pole tip region, and a bulb region adjacent the pole tip region; and
   through mask plating of the thin film head.

2. Method of producing a thin film head made of a magnetic alloy having a pole tip region with desired magnetic domain structures comprising:
   forming a mask having a yoke region, a narrower pole tip region and a bulb region adjacent the pole tip region; and
   using sheet plating techniques followed by etching using the mask to produce the thin film head.

3. Method of producing a thin film head made of a magnetic alloy having a pole tip region with desired magnetic domain structures comprising:
   forming a mask having a yoke region, a narrower pole tip region, and a bulb region adjacent the pole tip region; and
   using the mask to form pole piece geometry by vacuum deposition.

4. The method of claim 1 or claim 2 or claim 3 wherein the mask is formed using photoresist and photolithographic techniques.

5. A thin film head made according to the method of claim 1 or claim 2 or claim 3.

6. The method of claim 1 or claim 2 or claim 3 further including magnetic annealing of the pole piece of the thin film head.

7. The method of claim 1 or claim 2 or claim 3 wherein the magnetic alloy is negative magnetostrictive NiFe.

8. The method of claim 1 or claim 2 or claim 3 wherein the magnetic alloy is NiFeCo.

9. The method of claim 1 or claim 2 or claim 3 wherein the magnetic alloy is a CoZr alloy.

* * * * *